United States Patent [19]

Kövári et al.

[11] Patent Number: 4,553,885
[45] Date of Patent: Nov. 19, 1985

[54] APPARATUS FOR THE INITIAL AND IMPROVEMENT MACHINING OF ACTIVE SURFACE OF STEER CAMS, PARTICULARLY OF BRAKE SPANNERS

[75] Inventors: Pál Kövári; Tibor Galambos; Ferenc Bogisich; Imre Téringer, all of Györ, Hungary

[73] Assignee: Magyar Vagon-és Gépgyár, Györ, Hungary

[21] Appl. No.: 380,120

[22] Filed: May 20, 1982

[30] Foreign Application Priority Data

Jul. 6, 1981 [HU] Hungary ............................. 1962/81

[51] Int. Cl.⁴ .............................................. B23C 3/16
[52] U.S. Cl. ........................................ 409/201; 82/18; 409/145; 409/166; 409/200; 51/48 HE
[58] Field of Search .............. 409/165, 168, 199, 200, 409/138, 139, 142, 145, 162, 166, 189, 183, 197, 409/198, 201, 159, 169, 185, 186; 51/97 NC, 56 R, 51/56 G, 48 HE; 279/1 J; 82/18

[56] References Cited

U.S. PATENT DOCUMENTS

| 1,858,670 | 5/1932 | John | 409/199 |
|---|---|---|---|
| 2,716,844 | 9/1955 | Meyers | 51/56 |
| 3,164,930 | 1/1965 | Crosby | 51/56 |
| 3,304,660 | 2/1967 | Bindszus | 51/56 |
| 3,724,139 | 4/1973 | Leverenz | 51/48 HE |
| 3,886,693 | 6/1975 | Tajnafoi et al. | 51/97 NC |

FOREIGN PATENT DOCUMENTS

| 90704 | 4/1897 | Fed. Rep. of Germany | 82/18 |
|---|---|---|---|
| 147755 | 4/1981 | Fed. Rep. of Germany | 409/199 |
| 56-62704 | 5/1981 | Japan | 279/1 J |
| 17096 | 9/1900 | United Kingdom | 82/18 |
| 1325327 | 8/1973 | United Kingdom | 51/48 HE |
| 499975 | 3/1976 | U.S.S.R. | 82/18 |

*Primary Examiner*—Gil Weidenfeld
*Assistant Examiner*—Daniel W. Howell
*Attorney, Agent, or Firm*—Gabriel P. Katona

[57] ABSTRACT

An apparatus for original and improvement machining of the active surfaces of steer cams, mainly of brake spanners, in which the kinematic chain connecting together a work piece being rotation-safely clamped and a basic slide comprises a non-reversing free wheel, the external side of which being secured to the milling headstock. A unilateral claw clutch is coupled with the non-fixed inner part of the free wheel, the claw clutch being reversely operated with the non-reversing free wheel. A gear connectd to an intermediate shaft is in connection with one side of the unilateral claw clutch and elements are coupled with the gear, the elements transforming angular displacement to rectilinear displacement.

3 Claims, 8 Drawing Figures

APPARATUS FOR THE INITIAL AND IMPROVEMENT MACHINING OF ACTIVE SURFACE OF STEER CAMS, PARTICULARLY OF BRAKE SPANNERS

BACKGROUND OF THE INVENTION

The invention relates to an apparatus for the initial and improved machining of steer cams, brake spanners of automobiles, carried out by a face milling cutter or by the surface of a grinding wheel, the surface being perpendicular to its own axis of rotation, e.g. by a pot-shaped grinding wheel, where the profile of the brake spanner is mainly involute or the spiral of Archimedes.

An apparatus for the machining of the active surface of steer cams and brake spanners is known, in which a face milling cutter is employed as a tool. Such an apparatus is described on pages 36 and 37 of number 1978/5 of the Soviet monthly "Vestnik masinostroenija".

According to this known method of machining, the axis of rotation of the face milling cutter machining the active surface of the work piece is perpendicular to the axis of rotation of the work piece. The axis of rotation of the face milling cutter is parallel with the plane of the guide of the main headstock and is generally cross relative to the axis of rotation of the work piece.

The spindle driving the work piece is connected to a cam shaft through a gear drive of a one-to-one gear ratio. A master cam is located on the cam shaft on which the main headstock displaceable along a guide is pressed by spring. The shaft of the main spindle and the shaft of the face milling cutter secured to the main spindle, respectively, are parallel with the direction of movement of the main headstock. During one rotation of the cam shaft the face milling cutter machines a profile (active surface) of the work piece being identical with that of the master cam, according to the principle of mechanical copying.

A serious disadvantage of the known method lies in that the level of the technical implementation of the apparatus extremely falls behind the technical level of the method the apparatus is designed for. It is also noted that the surface machining principle of the method that can be carried out on the known apparatus by a face milling cutter is among one of the most advanced methods throughout the world, due to its low first-cost price.

Examining the drawbacks of the known apparatus individually, they are as follows:
  the load carrying capacity of the master cam is limited, because it is in contact with the driven mechanism along a line,
  the profile of the master cam can only be produced expensively and with a limited accuracy,
  different master cams are required to machine each separate steering cam,
  the known apparatus can limitedly be applied as regards to the shape and character of the master cams that can be machined, e.g. the profiles marked with heavy lines in FIG. 2 can not be machined, where the different profile sections follow each other with a large variation $\Delta R$ of the radius at a small central angle $\Delta \alpha$ and/or the profile sections are repeated two or more times along the generatrix.

Brake spanners of arbitrary profile, e.g. the active surface of the brake spanner according to the Hungarian Patent Specification 175.132 cannot be machined by the known apparatus. The profile of the active surface of said brake spanner, as an involute, is not derived from the base circle the center of which coincides with the axis of rotation of the brake spanner, but from a base circle the center of which is displaced from it in a given direction. This embodiment counterbalances the decrease in the braking force during operation. In FIG. 3 the involute profile of a concentric and an eccentric base circle are marked with heavy and dash lines, respectively, where the brake spanners operate identically and are mounted in the same position.

If the involute derived from the base circle of displaced center, marked with a dash line could be restored when the active surface of the outworn brake spanner is renewed then during the improvement an active surface of higher value of utility could be produced than that of the brake spanner when it was originally manufactured. The known apparatus does not afford such facility in which its main disadvantage lies. A further disadvantage is that only a single work piece can simultaneously be machined on the known apparatus which is disadvantageous in respect of productivity.

SUMMARY OF THE INVENTION

The aim of the invention is to provide—in contrast to the known apparatus—an apparatus for the original or improved machining of the active surface of steer cams, mainly of automobile brake spanners with an involute or an Archimedes-spiral profile, the machining being accomplished by a face milling cutter or by the surface of a grinding wheel, said surface being perpendicular to the axis of rotation of the grinding wheel, where the apparatus does not comprise any cam mechanism and is suitable for machining—at a high productivity—of the active surface in which the different profile sections follow each other with large variations of the radius at small central angles and/or they are repeated once or several times along the generatrix.

The essence of the invention will now be summed up as follows:
  The profile of the machine surface will be involute by coupling together the work piece and the main headstock in a spatial arrangement according to the known apparatus, but with a gear drive, with a Kinematic chain comprising elements transforming angular displacement into rectilinear displacement, e.g. gears and a gear rack.

Preserving the same arrangement and Kinematic chain, but employing a main headstock comprising a main spindle the shaft of which can be tilted relative to the plane of the basic slide guide, the profile of the machined surface will be a spiral of Archimedes.

Further developing the conception: if an eccentricity of fix or adjustable value between the geometrical and the rotational axes of the work piece clamping mechanism is assured (i.e. the work piece is rotated around an axis of rotation which does not coincide with the structural axis of rotation of the work piece), curves created by a transformation of displacing the axes of involutes and spirals of Archimedes can be obtained. As a result, by varying three factors: the gear ratio, the angle of tilting the main spindle shaft relative to the plane of the basic slide, and the eccentricity, an infinite assembly of different curves can be created.

This can be demonstrated as follows: it is supposed that involute or Archimedes-spiral profiles are to be obtained in the manufacture, where the difference of the base circles and of the eccentricities is at least 0,1 mm. In case of an apparatus offering a 20 mm range of base circle, the angle adjusting facilities required by that range as well as the range of eccentricity (200 involutes+200 spirals)×200 transformed positions=80,000 different curves can be obtained.

The problem arising from the large changes in radius related to small central angles and the problem of pitching arising from the twice or several times occurring repetitions of the active surfaces can be settled by connecting serially a unilateral claw clutch and a non-reversing free wheel and by arranging them in a Kinematic chain connecting together the work piece and the basic slide in such way, that the clutch and the free wheel operate in a reverse mode. Accordingly, the clutch opens in a direction of rotation in which the free wheel locks, and reversely.

The advantage of the apparatus according to the invention is:

it facilitates the highly productive and accurate machining of steer cams, mainly of the active surfaces of brake spanners, it facilitates the inexpensive, accurate and highly productive machining of active surface which otherwise can be produced only by forging or by copying shank cutting of low level (e.g. the machining of the brake spanner according to the referenred Hungarian Patent Specification), it facilitates a cutting of active surfaces of e.g. brake spanners which is competitive with finish forging.

Active surfaces of multiple accuracy can be produced at a lower price by the apparatus according to the invention than by finish forging.

On the whole, it can be concluded that the apparatus according to the invention—based on a new perception—facilitates in an extremely flexible way the productive, accurate and inexpensive initial machining of active surfaces of steer cams, mainly of brake spanners which has not been offered by any apparatus so far. At the same time if affords an improvement of the worn out active surfaces of brake spanners where the value of utility of the brake spanners after the renewal exceeds the original one.

The invention is further described purely by way of example of a preferred embodiment illustrated in the accompanying drawings, wherein:

DETAILED DESCRIPTION OF THE INVENTION

Figure 1:
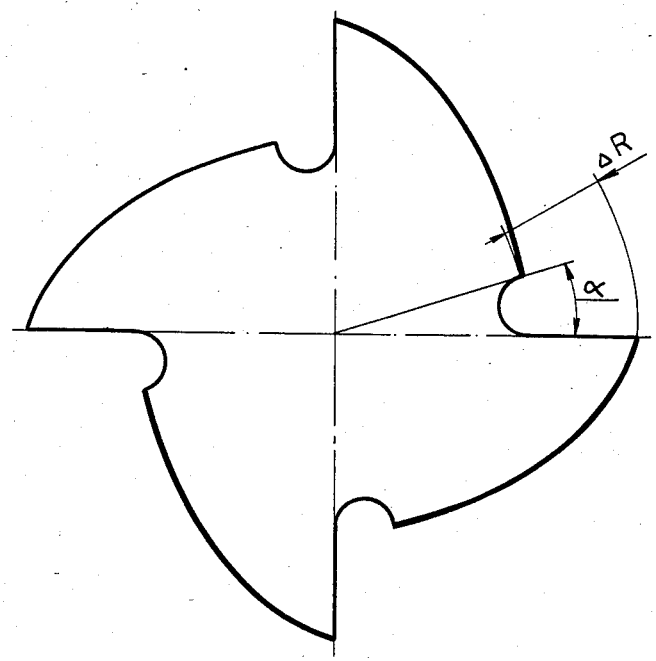
FIG. 1 is a view of a characteristic profile that can be produced by the apparatus according to the invention.
Figure 2:
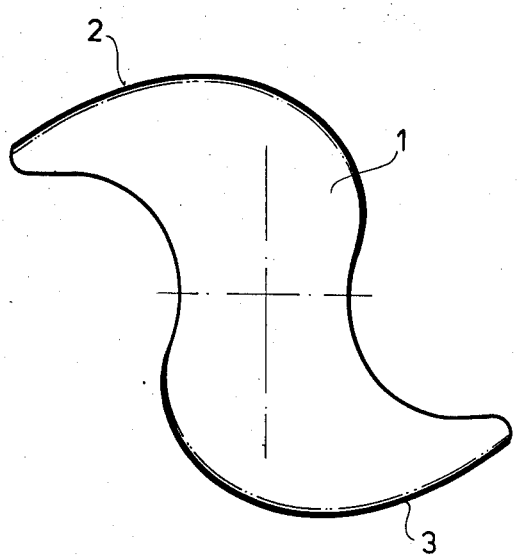
FIG. 2 is a view of the involute brake spanner in its original and improved states.
Figure 5:
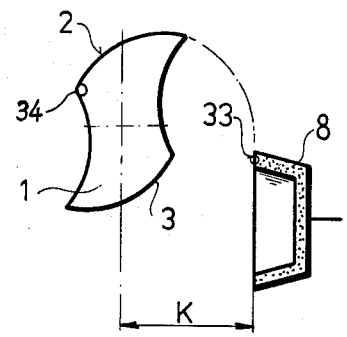
FIG. 5 is an elevational view taken from the direction V of FIG. 3, in an expanded scale.

The job of the apparatus is to machine the active surface 2 and 3 of the work piece 1 shown in FIGS. 2 and 5 to obtain the level of the thin lines shown in FIG. 2.

Figure 3:
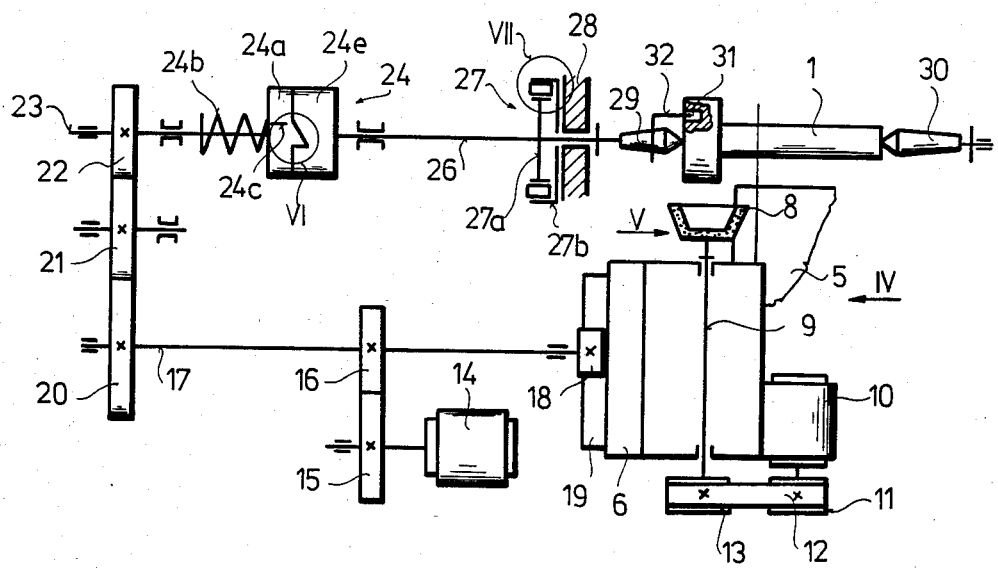
FIG. 3 is a kinematic diagrammatic view of the apparatus according to the invention.
Figure 4:
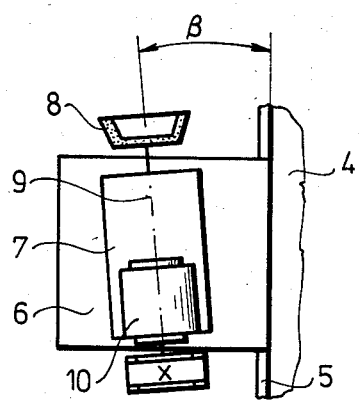
FIG. 4 is an elevational view taken from the direction IV of FIG. 3, in an expanded scale.

As shown in FIG. 3 and FIG. 4, the way 5 of the basic slide 6 on which the basic slide 6 can be displaced is arranged on the frame 4. The direction of movement of the basic slide 6, is perpendicular to the axis of rotation of the work piece 1, viewed from the plane of the basic slide way 5. A main headstock 7 that can be tilted in a plane being perpendicular to the plane of the slide way 5 is mounted on the basic slide 6, and the main spindle 9 carrying the head 8 of the cutting tool is supported with bearing in the main headstock 7. The angle $\beta$ between the main spindle 9 and the basic slide 5 can be adjusted. The main spindle 9 and the engine 10 of the main transmission are connected together through the discs 11, 13 and the driving element 12, e.g. through a vee-belt.

Figure 6:
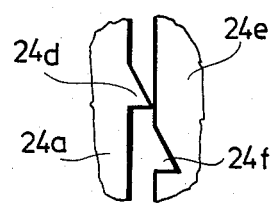
FIG. 6 is the detail VI of FIG. 3, in an expanded scale.
Figure 7:
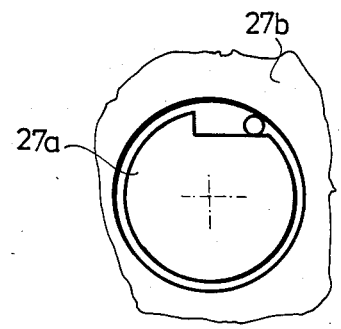
FIG. 7 is the detail VII of FIG. 3, in an expanded scale.

As shown in FIG. 3, the gear 15 being in connection with the gear 16 fastened to the regulating shaft 17 is secured on the axis of the motor 14 of the secondary transmission. One end of the regulating shaft 17 is coupled with the basic slide 6 through machine elements transforming rotary movement into recti-linear motion, e.g. through gear 18 and gear rack 19. The other end of the regulating shaft 17 is in connection with the intermediate shaft 23 through a geared transmission (driving gear 20, intermediate gear 21, driven gear 22). The intermediate shaft 23 is connected to the milling spindle 26 by a spring-loaded, unilateral claw clutch 24. One side 24a of the spring-loaded, unilateral claw clutch 24 being axially supported by the spring 24b is coupled with the intermediate shaft 23 through the gliding catch 24c. At least one, but at most as much claws 24d (FIG. 6) as the number of the active surfaces to be machined of the work piece 1 are formed on one side 24a of the unilateral claw clutch 24, or the number of said claws 24d is a multiple of the number of said surface. The outer side 24e of the spring-loaded, unilateral claw clutch 24 is secured to the milling spindle 26, the number of notches of said side 24e is equal to or the multiple of the active surface to be machined of the work piece 1. The inner part 27a of the non-reversing free-wheel 27 is fixed to the milling spindle 26, while the external part 27b is fixed to the milling headstock 28 (see FIG. 7). The spring-loaded, unilateral claw clutch 24 and the non-reversing free wheel 27 are operated in opposite directions.

The work piece 1 is clamped between the head center 29 arranged at the end of the milling spindle 26 and the dead center 30. A dog 32 fitting into the hole 31 of the work piece 1 is formed between the milling spindle 26 and the work piece 1 for the orientation relative to the milling spindle and for entrainment.

The operation of the apparatus according to the invention will now be described, e.g. in the case of the active surfaces 2, 3 being involute, as follows:

The work piece 1 is clamped between the headcenter 29 and the dead center 30 and is oriented in the front hole 31 by the dog 32. Then the gears 20, 22 are mounted on, where the number of teeth depends on the parameters of the involute.

The angle between the main spindle 9 and the basic slide 5 is adjusted to $\beta = 0°$. The distance K between the front face of the head of the cutting tool 8 and the axis of the work piece 1 is set according to the parameters of the active surfaces 3 as surfaces with an involute profile. The original situation is shown in FIG. 5, when the front face of the head of the cutting tool is in the position 33. The rotation of the main spindle 9 is switched on. The rotation of the motor 14 of the secondary driving is switched on in such a way that the basic slide 6 driven through the gear 18 and the gear rack 19 should approach the work piece 1 with a work down feed. At the same time, the milling spindle 26 along with the work piece 1 starts to be rotated by the gears 20, 21, 22 the spring-loaded, unilateral claw clutch 24 and the non-reversing free-wheel 27.

The such adjusted apparatus machines an active surface with involute profile. The work down feed goes on until the completion of machining the active surface 2, when the front face of the head 8 of the cutting tool arrives at the position 34. At that time the rotational sense of the motor 14 of the secondary transmission is reversed. The basic slide 6 along with the head 8 of the cutting tool arranged on the basic slide 6 returns to the starting position 33. The work piece 1 does not rotate during the fast back run of the basic slide 6 because the non-reversing free wheel 27 locks and the spring-loaded, unilateral claw clutch 24 declutches. At the beginning of the fast back run of the basic slide 6 the claw 24d protrudes from the notch 24f and is reclutched with another notch located at an angle of 180° from the notch 24f, when the front face of the head 8 of the cutting tool being arranged on the basic slide 6 returns to the starting position 33. Then the active surface 3 is being machined as described above, and—by repeated returns of the front face of the head 8 of the cutting tool to the starting position 33—the machining of both active surfaces 2 and 3 of the whole work piece 1 terminates in a half automatic cycle. The work piece 1 is removed from among the centers 29 and 30.

Figure 8:
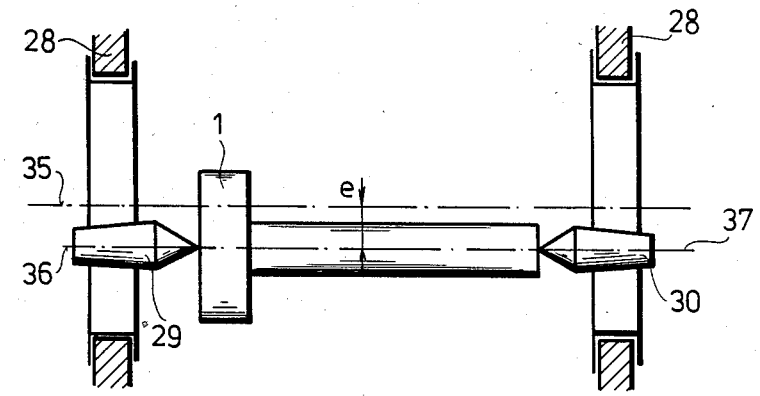
FIG. 8 is a view of the eccentrically clamped work piece.

A preferred embodiment of the apparatus according to the invention shown in FIG. 8 is one in which there is an eccentricity 'e' of fix or adjustable value between the geometrical axis 36, 37 and the axis of rotation 35 of each center 29, 30 carrying the work piece 1 or of other mechanism for clamping the work piece.

A further preferred embodiment is one which comprises further milling spindles coupled with the milling spindle 26 by a slip-free transmission. In this case—by properly selecting the diameter of the head 8 of the cutting tool and the distances between the shafts of the milling spindles—two work pieces 1 can simultaneously be machined by the head 8 of the cutting tool.

In order to increase productivity, the number of milling spindles 26 and of the heads 8 of cutting tools can be increased at will, while the apparatus will not be much more sophisticated, because the described kinematic chain connecting the work piece 1 with the basic slide 6 can operate an apparatus which is provided with an optional number of milling spindles 26 and heads 8 of cutting tools.

Accordingly, the apparatus according to the invention comprises a head 8 of cutting tool and a milling spindle 26, or, one or more heads of cutting tools and several milling spindles being coupled with the milling spindle 26 in a slip-free way.

In the apparatus according to the invention the milling spindle can be coupled to the bed frame, the main headstock to the basic slide, or reversely.

We claim:

1. In an apparatus for the machining of the active surfaces of steer cams, having a cutting tool and a basic slide mounting the cutting tool for movement along a line, the improvement comprising: means for rotatably clamping a workpiece perpendicular to said line and including a milling headstock; and a kinematic chain for rotating the workpiece and for transforming angular displacement of the workpiece into rectilinear displacement of the slide and cutting tool comprising a motor, a non-reversing free wheel having an internal part rotatable in one direction and an external part secured to the milling headstock, a unilateral claw clutch having one side coupled with the internal part of the free wheel and wherein the claw clutch is operable in the opposite direction than that of the non-reversing free wheel, a first gear, an intermediate shaft connected to the other side of the unilateral claw clutch and the first gear, a driving gear coupled to a driving shaft driven by said motor and coupled to said first gear and a gear and gear rack driven by the driving shaft and coupled to the basic slide.

2. The apparatus as claimed in claim 1, wherein the unilateral claw clutch is spring-loaded.

3. The apparatus as claimed in claim 1 or 2, wherein the means clamping the work piece comprises centers having an eccentricity of fix between the geometrical axis of the workpiece and the axis of rotation of the centers.

* * * * *